United States Patent [19]

Fennel et al.

[11] Patent Number: 4,736,994
[45] Date of Patent: Apr. 12, 1988

[54] CIRCUIT CONFIGURATION FOR CONTROLLING THE BRAKING PRESSURE OF A SLIP-CONTROLLED BRAKE SYSTEM FOR ALL-WHEEL DRIVEN AUTOMOTIVE VEHICLES

[75] Inventors: Helmut Fennel, Bad Soden; Hans Wupper, Friedrichsdorf; Gunther Buschmann, Griesheim; Norbert Ehmer, Waechtersbach, all of Fed. Rep. of Germany

[73] Assignee: Alfred Teves GmbH, Frankfurt Am Main, Fed. Rep. of Germany

[21] Appl. No.: 914,647

[22] Filed: Oct. 2, 1986

[30] Foreign Application Priority Data

Oct. 2, 1985 [DE] Fed. Rep. of Germany ....... 3535110

[51] Int. Cl.$^4$ .............................................. B60T 8/66
[52] U.S. Cl. .................................. 303/111; 364/426
[58] Field of Search ................. 180/197; 303/93, 96, 303/109, 110, 111; 364/426

[56] References Cited

U.S. PATENT DOCUMENTS

| | | | |
|---|---|---|---|
| 4,439,832 | 3/1984 | Sato et al. | 303/111 X |
| 4,643,485 | 2/1987 | Leiber | 303/96 |
| 4,643,492 | 2/1987 | Belart et al. | 303/111 X |
| 4,657,313 | 4/1987 | Fennel et al. | 303/111 X |

Primary Examiner—Duane A. Reger
Attorney, Agent, or Firm—James B. Raden; Robert P. Seitter

[57] ABSTRACT

To control the braking pressure in the wheel brakes of a slip-controlled hydraulic brake system for automotive vehicles with all-wheel drive and with lockable or automatically locking differentials (2, 3), a circuit configuration is provided which influences the variation of the vehicle reference speed ($v_{REF}$). This is to say, in the event of the wheel ($v_{Rn}$) which is momentarily decisive for the formation of references becoming instable, the reference speed ($v_{REF}$) will first be declined with a relatively flat gradient which corresponds to a vehicle deceleration at a low frictional coefficient. A decrease of the vehicle reference speed ($v_{REF}$) with a very steep gradient will follow after a predetermined period of time ($T_1$). This decrease is continued until the vehicle reference speed ($v_{REF}$) reaches the decisive wheel speed again or falls thereunder. To avoid oscillations, the change-over of the reference ($v_{REF}$) after the attainment of the wheel speed curves ($v_{Rn}$) will not be effected until after a predetermined time of delay ($T_2$ or $T_3$).

4 Claims, 3 Drawing Sheets

CIRCUIT CONFIGURATION FOR CONTROLLING THE BRAKING PRESSURE OF A SLIP-CONTROLLED BRAKE SYSTEM FOR ALL-WHEEL DRIVEN AUTOMOTIVE VEHICLES

BACKGROUND OF THE INVENTION

The present invention relates to a circuit configuration for controlling the braking pressure in the wheel brakes of a slip-controlled hydraulic brake system for automotive vehicles with all-wheel drive and with lockable or automatically locking differentials. Sensors are provided for measuring the wheel rotational behavior as are electronic circuits for logically combining and processing the sensor signals and for generating braking-pressure control signals. By means of the signals, the braking pressure is variable as a function of the wheel rotational behavior and a vehicle reference speed. The reference speed is derived from the sensor signals and which serves as a reference value for proportioning the braking pressure in the individual wheel brakes in response to the rotational behavior of the respective wheel. The reference speed, according to predefined criteria, is temporarily determined by the speed of a specific wheel, for example, the fastest or the second fastest wheel, and temporarily rising or decling with a specific gradient.

Electronic circuits for controlling the valves, by virtue of which the braking pressure in the wheel brakes of slip-controlled hydraulic brake systems is modulated, are known. To control the wheel slip, the rotational behavior of the wheels is measured and compared with a reference value, frequently termed as vehicle reference speed. From the discrepancy of the actual rotational behavior of a wheel from the reference value, which could include taking into consideration further criteria and measured values in respect of driving dynamics, conclusions can be drawn in regard to the control and variation of the pressure which is required for the adjustment of an optimal wheel slip and thus for ensuring a short stopping distance, while driving stability and steerability are also preserved.

In conventional practice, the information relating to the actual vehicle speed and vehicle deceleration, wherein, in turn, the vehicle reference speed can be derived as a reference variable for controlling the braking pressure is gained with the aid of wheel sensors and by logic combining and processing of the measured signals dependent on the rotational behavior of the individual wheels.

The vehicle reference speed can be interpreted as vehicle speed at optimal brake slip. As the reference speed serves as a reference variable for controlling the braking pressure, it is of decisive importance for the attainable quality of slip control. While in vehicles with only one driven axle the free-running non-driven wheels and their comparison to the driven wheels allow precise conclusions with respect to the speed and deceleration of the vehicle, the determination of an appopriate vehicle reference speed in vehicles with all-wheel drive entails major difficulties which are further complicated by the presence of locks in the differentials. The coupling by way of the drive shafts, the differentials and differential locks in many situations has as a result a largely synchronous wheel rotational behavior which makes it very difficult to judge the actual wheel slip and the vehicle behavior. The masses increased by the co-rotating drive shafts and driving wheels, moreover, result in high moments of inertia which delay the reaction on braking pressure variations. The transfer of moments by way of the coupled driving results in an apparent increase of the moments of inertia.

In order to be able to use slip-controlled brake system in vehicles with all-wheel drive and with differential locks desptie these difficulties, vehicles have been known wherein the engagement of the differential locks is coincident with a disconnection of slip control. It is, however, a disadvantage that especially under such road conditions where slip control would otherwise provide for driving stability and steerability of the vehicle, such control must be dispensed with.

Another suggestion to resolve the problems resides in that the differential lock is automatically released upon commencement of slip control (German patent application No. 34 18 520.8). It has likewise been proposed to insert a disconnecting clutch into the split-axle transferring the driving torque form the differential onto the wheel, which disconnecting clutch will automatically disengage upon commencement of slip control (German patent application No. 34 26 747. 6). Both suggestions precondition to mount clutches actuatable by the slip control for the purpose of interruption of the driving tracks or for release of the differential locks.

It is, therefore, an object of the present invention to overcome these shortcomings and to provide a circuit configuration which, despite the transmission of torques via the driving tracks and despite the actual as well as the seemingly high moments of inertia, permits control of the brake slip of an all-wheel driven automotive vehicle equipped with lockable differentials and to thereby safeguard a short stopping distance and high driving stability at the same time.

SUMMARY OF THE INVENTION

This object is achieved in a simple and technically progressive manner by a circuit configuration of the type initially referred to in such a manner that the circuit will decrease the vehicle reference speed upon decline of the speed of all wheels below the vehicle speed or vehicle reference speed determined immediately before for a predetermined maximum period of time with a constant, relatively flat gradient which corresponds to a vehicle deceleration at a low frictional coefficient. After expiration of the predetermined period of time the reference speed will decrease with a steep gradient which corresponds to a vehicle deceleration which is not even at a high frictional coefficient physically possible. The decrease is effected until the vehicle reference speed has attained the decisive wheel speed or falls thereunder.

Hence it follows that, according to the present invention, when forming the vehicle reference speed, first a coupling effect is provided in any situation which results in a largely synchronous behavior of all wheels. Therefore, the reference speed is decreased initially very cautiously, and subsequently after a specific period of time relatively steeply. As discussed more fully hereinafter, this reliably avoids an excessive discrepancy of the reference speed from the wheel speed which is caused by the coupling and could result in locking of the wheels. Due to the steep decrease of the reference speed subsequent to the flat range, rapid approximation of the reference speed to the vehicle speed will be accomplished, and an extended stopping distance thereby will be prevented.

According to a favorable embodiment of the present invention, the incipiently flat gradient, the maximum period of time until change over to the steep gradient and the threshold value of response of the slip control are adapted to one another such that the maximum discrepancy between the vehicle reference speed and the wheel speed, with the wheels running stably during braking at a high frictional coefficient, is just below the threshold of initiating a slip control action and thus a pressure decrease.

Favorably, the incipiently flat gradient corresponds to a vehicle deceleration in the range between 0.2 and 0.5 g, in particular between 0.25 and 0.35 g, with 'g' representing the constant of the acceleration due to gravity. Expediently, the steep gradient lies in the range between 1 and 3 g, preferably between 1.2 and 1.8 g.

It is a further advantage in many cases if the predefined period of time in which the vehicle reference speed declines with a flat gradient has a value of between 30 and 200 milliseconds, and preferably between 50 and 100 milliseconds.

According to another embodiment of the present invention, it is feasible if the decline of the vehicle reference speed within the range of the decrease with steep gradient will continue to last for a predefined short period of time of, for example 10 to 30 milliseconds when the wheel speed decisive for the control is attained, kept under or exceeded.

Furthermore, in another embodiment of the present invention, during a slip control action, the variation of the vehicle reference speed is continued with the gradient unchanged for a predetermined period of time of 20 to 100 milliseconds, in particular 30 to 50 milliseconds, when the wheel speed which is at that moment decisive for slip control is attained and is remainded under. It is an advantage in some applications if the flat and the steep gradient, with which the reference speed is declining, and/or the predetermined periods of time are variable as a function of the vehicle speed.

Another embodiment provides that in the event of a constantly unstable braking behavior of three or four vehicle wheels, the circuitry will initiate a change over of the reference speed to the wheel rotating at highest speed after a predetermined period of time. This period of time until the change-over can be in the range between 300 and 1000 milliseconds, in particular between 400 and 600 milliseconds. If unstability continues after the change-over, this is recognized by the circuitry as an interference and results in change-over to a second operating condition in which the braking pressure variation is controllable individually for each wheel as a function of the respective wheel acceleration and deceleration. The dependency on a reference variable is eliminated. The change-over to this operating condition is suitably effected after 100 to 500 milliseconds, in particular after 200 to 300 milliseconds.

BRIEF DESCRIPTION OF THE DRAWING

Further features, advantages and applications of the present invention can be gathered from the following description when taken in conjunction with the accompanying drawing wherein.

DETAILED DESCRIPTION

Figure 1:
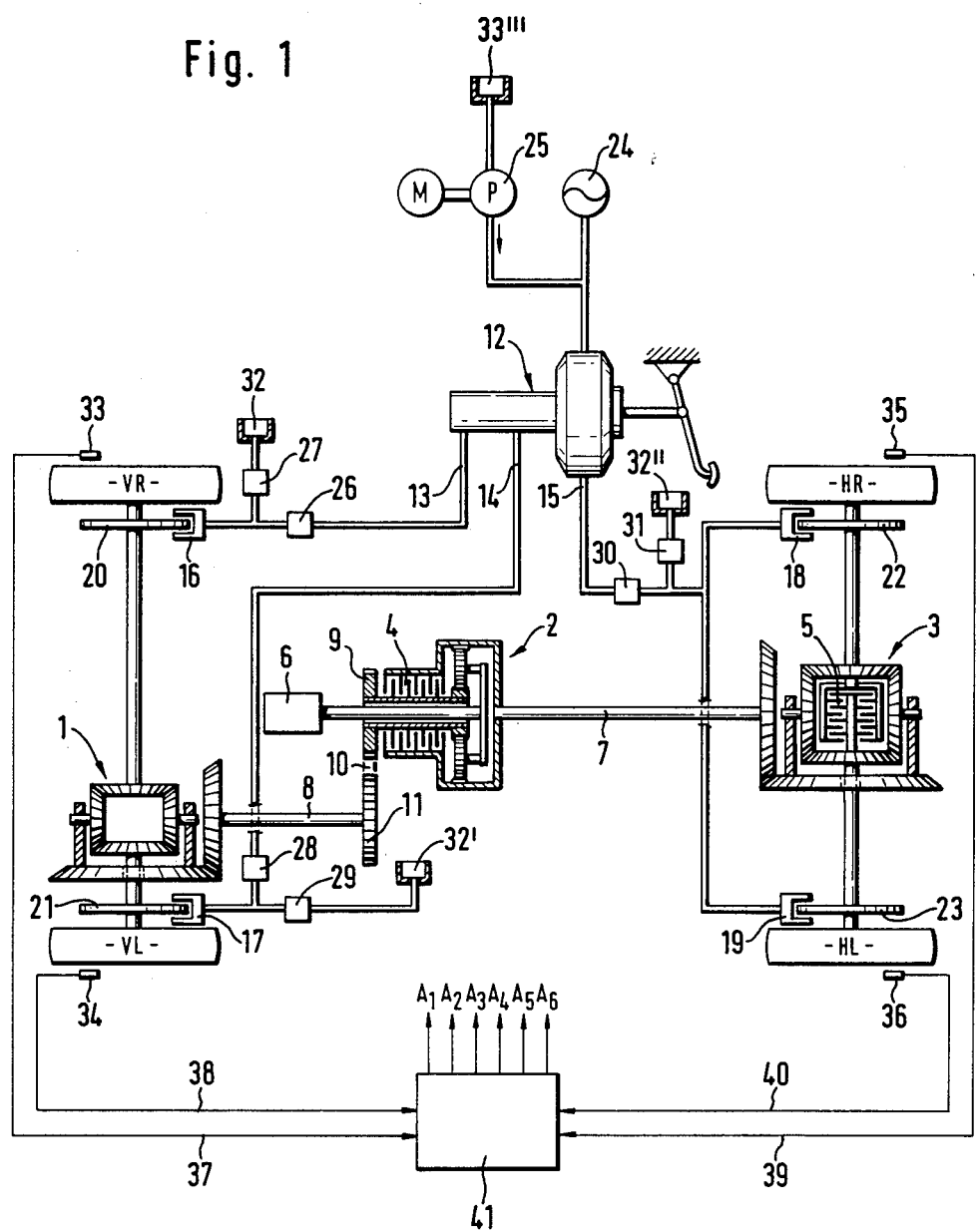
FIG. 1 is a schematic illustration of the driving track as well as of the hydraulic wiring diagram of a slip-controlled brake system of a vehicle with all-wheel drive and with lockable differentials.

The vehicle illustrated in FIG. 1 is equipped with all-wheel drive. To this end, the drive track comprises three differentials, that is a front-wheel differential 1, a distribution diffferential 2 and a rear-axle differential 3. Provided in the distribution differential 2 and in the rear-wheel differential 3 are so-called visco-couplings 4, 5 serving as differential locks. The couplings include meshing vanes which by way of a high-viscous fluid, are in engagement with one another. Therefore, these visco-couplings 4, 5 build up a speed-responsive locking torque growing with an increasing difference of rotational speed.

Referring to FIG. 1, the driving motor of the vehicle shown inclusive of a switch gear is designated by reference numeral 6. The distribution differential 2 which, in the present instance, is configured as a planetary gear, transmits the driving power of the motor 6 by way of a drive shaft 7 to the rear-axle differential 3, on the one hand, and by way of a shaft 8 to the front-wheel differential 1, on the one hand. To lead the drive torque from the distribution differential 2 on to the front axle, a sprocket 9 is seated on a hollow shaft of the planetary gear 2, which sprocket, by way of chain 10, is in engagement with a sprocket 11 secured on the shaft 8. In FIG. 1, the front wheels are referred to by VR, VL, the rear wheels by HR, HL.

The brake system of the illustrated all-wheel vehicle comprises a hydraulic braking pressure generator 12, to which wheel brakes 16 to 19 are connected by way of three hydraulically separated pressure fluid circuits 13, 14, 15. These brakes are disc brakes whose brake pads, when the brakes are applied, are urged on either side against the associated brake discs 20 to 23 rotating with the wheels. To supply the hydraulic braking pressure generator 12 with auxiliary energy, there is provision of an auxiliary-pressure source which is substantially composed of a hydraulic accumulator 24 and an electromotively driven pressure fluid pump 25.

Pairs of valves 26, 27; 28, 29 and 30, 31 are inserted into the pressure fluid conduits 13, 14, 15 leading from the braking pressure generator 12 to the wheel brakes 16 to 19. The valves are electrically or electromagnetically actuatable and by which the braking pressure can be maintained constant, decreased and re-increased during a controlled braking action. The valves 26, 28 and 30 inserted into the pressure fluid conduits 13, 14, 15 from the braking pressure generator 12 to the wheel brakes 16 to 19 normally assume their opened position and serve as inlet valves, while the so-termed outlet valves 27, 29 and 31 which are closed in their inactive position after change-over allow pressure fluid to return to a pressure-compensating reservoir 32 and 32', respectively, or 32". Braking pressure is discharged by way of these outlet valves upon an imminent locked condition of a wheel.

Expediently, the compensating reservoirs 32, 32' and 32" are structurally united with a (non-illustrated) pressure-compensating and supply reservoir of the braking pressure generator, connected to which, in addition, is the suction side of the hydraulic pump 25 which terminates into a reservoir 32''' in FIG. 1. By way of the compensating reservoir, the pressure fluid discharged through the outlet valves 27, 39, 31 for the purpose of pressure decrease will be returned into the braking pressure generator 12 and into the brake circuits 13, 14, 15.

In the brake system illustrated, the braking pressure in the front-wheel brakes 16, 17 can be controlled individually through the valve pairs 26, 27 and 28, 29, respectively, whereas for both rear wheels HR, HL, that is for the rear-wheel brakes 18, 19, only one common pair of braking-pressure control valves 30, 31 is available. The braking pressure in the rear-wheel brakes 18, 19, in this instance, is dependent on the rear wheel having the poorer road contact, with the so-called "select-low" criterion applying.

The rotational behavior of the wheels is permanently measured by wheel sensors 33 to 36, for instance inductive pickups for measuring data, which feed their information by way of signal lines 37 to 40 into an electronic control unit 41. This control unit 41 contains electronic circuits editing, logically combining and processing the measured signals. Additionally, these circuits produce the braking pressure control signals which, after amplification, by the outlets $A_1$ to $A_6$ of the control unit and by way of signal lines (not shown) are supplied to the individual valves 26 to 31 and by way of which the braking pressure variation is finally governed after commencement of brake slip control. The circuits in the control unit 41 can be hard-wired logic circuits or programmed circuits such as microcomputers.

The special features of the circuitry in accordance with the present invention are depicted in the diagrams according to FIGS. 2 A to D which display in each case the speed variation $v_{Rn}$ of the monitored vehicle wheel n as well as the reference speed $v_{REF}$ as a function of time during different braking situations.

Figure 2A:
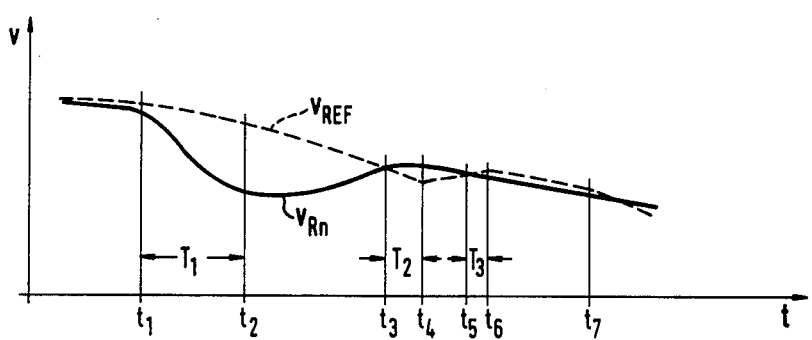
FIGS. 2A–2D are diagrams of the vehicle reference speed in comparison with the wheel speed when using a circuit configuration of the present invention in conjunction with the brake system according to FIG. 1; and, FIG. 3 is the block diagram of an embodiment of the circuit configuration in accordance with the principles of the present invention.

In FIG. 2A, the drawn line represents the speed $v_{Rn}$ of that wheel, for instance the momentarily fastest vehicle wheel, which is decisive for the formation of the reference speed $v_{REF}$ at the point of time considered. The wheel momentarily taken for the formation of the reference speed is chosen in control circuits by logic combining of various conditions in consecutive calculating cycles according to several selection criteria. For instance, first a wheel relieved due to cornering or a spinning wheel can be recognized and expelled from the reference formation.

The circuitry in accordance with the present invention is provided for vehicles with all-wheel drive and with lockable gears, in particular for such all-wheel driven vehicles whose distribution and/or rear-wheel differentials are equipped with so-called visco-couplings in the capacity of speed-responsive differential locks. As has been described in such vehicles, coupling of the wheels and the torques transmission caused thereby renders slip control considerably more complicated. This is because in many situations there is lack of information about the actual vehicle speed and vehicle acceleration because all wheels may quasi synchronously adopt a too high or a too low slip value. Consequently, the reference speed becomes faulty, which can result in locking of the wheels, neutralization of the braking effect or oscillations.

According to the present invention, these difficulties are overcome by virtue of a circuit configuration forming the vehicle reference speed $v_{REF}$ in a special manner. Thus, according to FIG. 2A, the speed $v_{Rn}$ of the monitored wheel without deceleration will approach a critical value at the point of time $t_1$. While until this point of time $t_1$ both prior to and after actuation of the brake, the $v_{REF}$ shown in dotted lines followed the vehicle speed $v_{Rn}$, now the reference value $v_{REF}$ will first be declined with a relatively flat gradient. This gradient corresponds to a vehicle deceleration on slippery road surfaces, for instance on a road surface with frictional coefficient of u=0.3. At the point of time $t_2$, after a fixed period of time $T_1$ of, for example, 80 milliseconds has lapsed and the reference speed $v_{REF}$ still differs from the wheel speed $v_{Rn}$, the gradient of decrease is now changed over, whereby the reference value $v_{REF}$ is reduced with a steep gradient which corresponds to a vehicle deceleration of, for example, 1, 5 g which is not possible for physical reasons. Therefore, the reference speed $v_{REF}$ (with the control intact) must decline in any situation after a short time to the wheel speed $v_{Rn}$, that means must reach the curve $v_{Rn}$ drawn in FIG. 2A. This takes place at the point of time $t_3$.

In the embodiment of a control circuit described herein, the steep decrease of the reference speed $v_{REF}$ after the exceeding of the wheel speed characteristic curve $v_{Rn}$ is continued for a predetermined invariable period of time of, for example, 30 to 40 milliseconds, in order to avoid oscillations. Only if after the lapse of this period of time $T_2$ at the point of time $t_4$ the wheel characteristic curve $v_{Rn}$ is still in excess of the reference characteristic curve $v_{REF}$ will the decrease be terminated and will renewed rise in dependence on the speed of the decisive wheel be admitted. In a similar manner, the gradient of the reference variable $v_{REF}$ will be maintained unmodified in the event of the wheel characteristic curve $v_{Rn}$ declining below a rising branch of the reference $v_{REF}$ at the point of time $t_5$ for an invariably predefined period of time $T_3$, as long as both characteristic curves will not intersect again. The allowed times for the deceleration period $T_2$, $T_3$ may be the same, they may differ from one another, or they may be adapted in various steps to the respective vehicle speed.

Figure 2B:
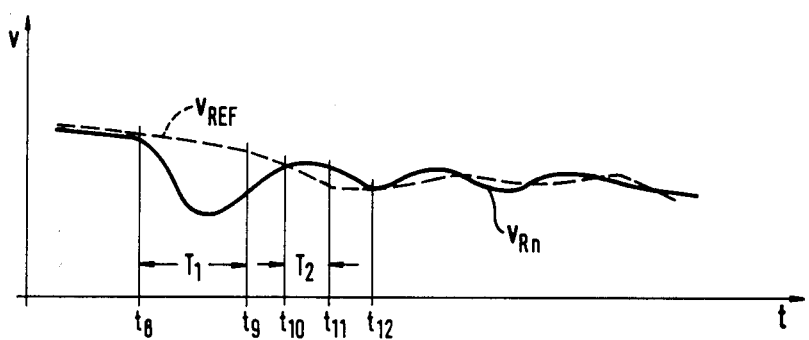

FIG. 2B illustrates by way of another braking action, that spinning wheels will not be considered by the inventive circuitry for the reference formation. Herein, the monitored wheel $R_n$ becomes unstable at the point of time $t_8$. After the initially cautious decrease until the point of time $t_9$ follows the change-over to a decrease of the reference speed $v_{REF}$ with a steep gradient as in the example according to FIG. 2A. At the point of time $t_{10}$, the wheel speed $v_{Rn}$ drops below the reference characteristic curve$_{REF}$. The decrease is continued nevertheless and, that is to say, first for the predefined period of time $T_2$. Subsequently following are a period with a flatly declining gradient (until $t_{12}$) and a short period in which the reference variable $v_{REF}$ is practically coincident with the wheel speed $v_{Rn}$. Consecutive thereto are periods with a linear, flat rise or drop of the reference variable $V_{REF}$, in which the reference varaible $v_{REF}$ with a decreasing amplitude alternately is above or below the wheel curve $v_{Rn}$. The suppressing of oscillations is particularly important in vehicles of the type disclosed in FIG. 1 which are equipped with all-wheel drive and lockable differentials, because such wheel oscillations, as previously explained, are favored by the couplings by way of the driving tracks.

Figure 2C:
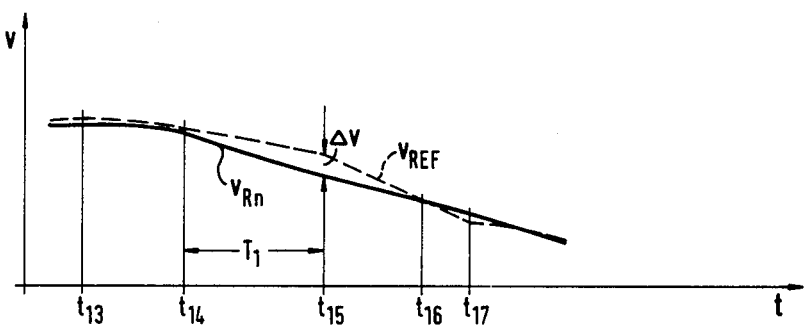

FIG. 2C relates to a braking action at a high coefficient of friction, for instance, on a dry road with a nonskid pavement. The brake is actuated at the point of time $t_{13}$. Since, in this instance, the vehicle is decelerated with, for example, 0.6 g ('g' representing the constant of the acceleration due to gravity of about 9.81 m/s$_2$), the reference variable $v_{REF}$ will not be able after the point of time $t_{14}$ to follow the steeply declining wheel speed $v_{Rn}$. Only after expiration of the period of time $T_1$ will the decrease of the reference variable $v_{REF}$ with a high gradient start, so that both characteristic curves $v_{REF}$ and, respectively, $v_{Rn}$ will coincide again at the point of time $t_{16}$. The maximum divergence delta v between the reference variable $v_{REF}$ and the wheel speed $v_{Rn}$ is thus prevailing at the point of time of change-over $t_{15}$. In a preferred embodiment of this invention, the predetermined gradients by which $v_{REF}$ can decrease as well as the period of time $T_1$ until the change-over will be chosen such that the maximum divergence delta v is just not yet sufficient to initiate a control action, that is to reduce the braking pressure.

Figure 2D:
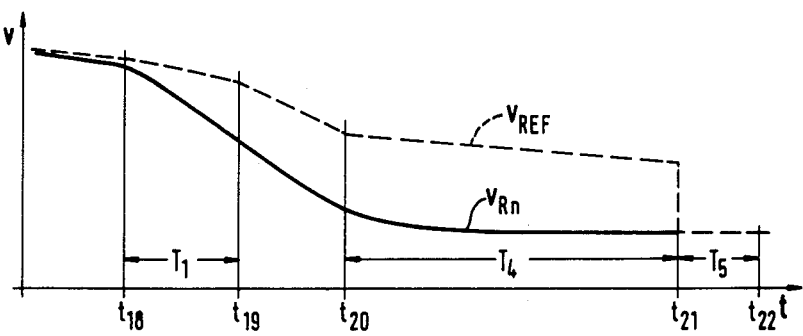

The course of the curve according to FIG. 2D illustrates the variation of the reference speed upon the occurrence of an error. At the point of time $t_{18}$, the control detects instability, which first has as a result, in the manner described, decrease of the reference speed $v_{REF}$ with a flat gradient for a period of time $T_1$. The subsequently steep decrease of the reference speed will not result in regaining a stable wheel rotational behavior in this case. It is rather so that three vehicle wheels or all of them show an unstable behavior at the point of time $t_{20}$, for which reason the reference speed will be decreased for a longer period of time $T_4$ for, for example, 500 millisecs with a flat gradient of e.g. 0.2 to 0.3 g. As this measure also will not have the desired result, the reference speed $v_{REF}$ will be decreased to the wheel speed $v_{Rn}$ at the point of time $t_{21}$. If the unstable condition continues to prevail, finally at the point of time $t_{22}$ and after lapse of a waiting time $T_5$ of, example, 200 millisecs, the control will be changed over to another operating condition in which only the wheel-individual acceleration and deceleration behavior will influence the braking pressure control. In this operating condition, no reference speed is taken into account for control.

Instead of the point of time $t_{21}$, likewise the point of time $t_{20}$ can be taken into consideration as a reference point for the period of time until the change-over to the second operating condition. In this case, the predefined waiting time is $T_4+T_5$.

Figure 3:
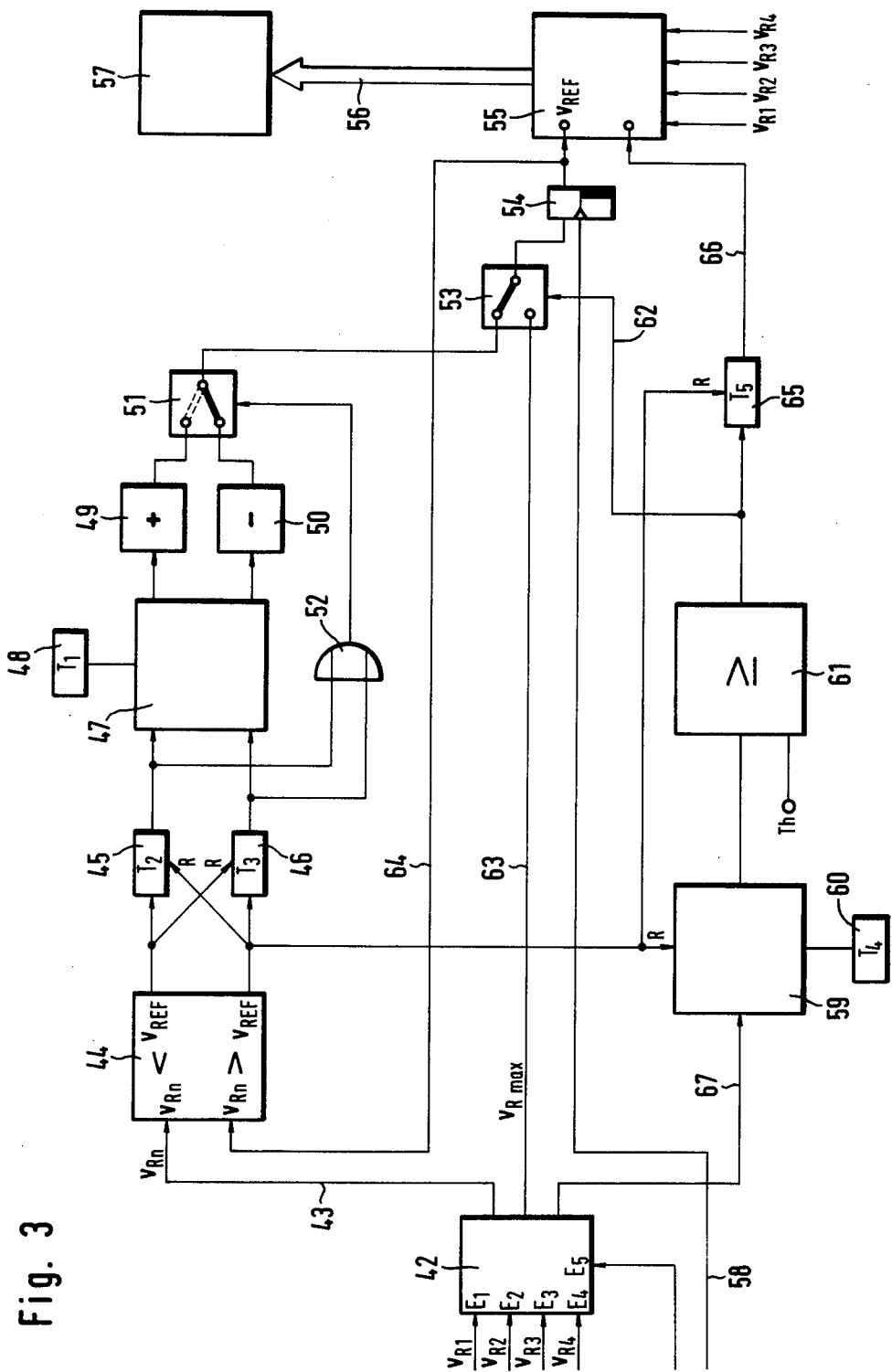

The block diagram according to FIG. 3 shows the most important module units in the circuit configuration according to the present invention. In a selector circuit 42 supplied by way of its inputs $E_1$ to $E_4$ with information about the rotational behavior of the individual vehicle wheels, first the wheel $R_n$ that is the speed $v_{Rn}$ is selected which is decisive in the period considered for the variation and the change of the reference speed $v_{REF}$. The corresponding information is delivered to a comparator 44 by way of signal line 43. By way of the input $E_5$, the circuitry is informed about the start of a control cycle.

The outlets of the comparator 44 lead to time steps 45, 46 which, after the period of time $T_2$ or $T_3$ (see FIGS. 2A and 2B) deliver a signal to a second selector circuit 47 and thereby determine the gradient for the further variation of the reference speed in the fashion described. The time step 48 connected to the circuit 47 serves to determine the period of time $T_1$ in which the reference speed declines with a flat gradient. By way of RESET inlets R, the time steps 45 and 46 are reset alternately by the output signals of the comparator 44.

By virtue of an adder and a subtractor 49 and 50, respectively, a switch 51 whose switch position is dependent on the output signal of the time steps 45, 46, the reference variable $v_{REF}$ selected in the circuit 47 is either augmented or decreased. Actuation of the switch 51 is performed by way of an OR-gate 52 which is supplied with a signal by the outlet of either the time step 45 or the step 46. By way of another switch 53 and by way of an edge-triggered flip flop 54, a single corresponding to the reference speed is supplied to the outlet of the flip flop 54. The outlet of the flip flop 54 finally leads to a conventional electronic brake slip control unit 55 in which, as a function of the sensor signals or the speed variation $v_{R1}$ to $v_{R4}$ of the individual wheels, signals are generated for the control of the braking pressure and are supplied by way of signal lines 56 to braking pressure modulator 57.

In the embodiment shown, the flip flop 54 is controlled by the leading flank of a signal which is supplied as a so-termed scanning signal of the system by way of a line 58. This signal serves to carry out the individual calculations, to compare the values and, depending on the result, to vary the outut values according to a predetermined clock.

To monitor the formation of references and to detect error functions, there is provided a monitoring circuit 59. To reset this circuit 59, the RESET-input R communicates with an output of the comparator 44, where a signal will be present as soon as the selected wheel speed $v_{Rn}$ is greater than the reference speed $v_{REF}$ in the previous clock. Connected to the monitoring circuit 59 is a time step 60 which defines the monitoring time $T_4$ of 400 to 600 millisecs, for instance. Said time step 60 is put into function when it is signalled by way of the signal line 67 that three or four of the vehicle wheels become unstable. After lapse of the period of time $T_4$, it will be ascertained in a subsequent comparator 61, whether the reference speed $V_{REf}$ continues to be in excess of a threshold value Th. If this is so the consequence will be change-over of the switch 53 by way of the signal line 62, whereupon the speed of the fastest wheel $v_{Rmax}$ which is determined by the selector circuit 42 is delivered to the output of the flip flop 54. The corresponding output of step 42 is in communication with the input of switch 53 by way of the signal line 63. The reference speed $v_{REF}$ is returned to the second input of the comparator 44 by way of a signal line 64.

Additionally, another time step 65 is connected to the output of the comparator 61 which likewise will be reset as soon as the wheel speed becomes greater than the reference speed. Switching over of the switch 53 also sets the time step $T_5$ to operate. If, after expiry of this time $T_5$ of, for example, 200 to 400 milliseconds, this unstable condition is still prevailing, by way of the output of the clock generator 65 communicating with the control unit 55 by way of a signal line 66, there will be performed change-over to a second operating condition in which braking pressure control is dependent only on the wheel-individual acceleration and deceleration, and not on a reference variable.

What is claimed is:
1. A system for controlling the braking pressure in the wheel brakes of a slip-controlled brake system for an automotive vehicle having vehicle wheels and all-wheel drive, said system comprising, in combination:
   a plurality of sensors operatively coupled to said vehicle wheels for providing sensor signals indicative of wheel rotational behavior;

means coupled to said sensors and responsive to said sensor signals for providing a vehicle reference speed signal indicative of the speed of a selected one of said wheels;

means coupled to said sensors and responsive to said sensor signals and said reference speed signal for providing braking pressure control signals for varying said braking pressure in response to predetermined wheel rotational behavior;

means for decreasing said reference speed signal for a predetermined time period ($T_1$) in accordance with a substantially flat gradient rate corresponding to a vehicle deceleration rate at a low frictional coefficient when the speed of all of said wheels falls below the immediately precedingly provided reference speed signal value; and, means for decreasing said reference speed signal after said time period and in accordance with a steep gradient rate relative to said flat gradient rate and corresponding to a vehicle deceleration at a high frictional coefficient.

2. The system according to claim 1, wherein said reference speed signal is decreased in accordance with said steep gradient until said reference speed signal is equal to or less than the speed of said selected one of said wheels.

3. The system as claimed in claim 1, wherein said flat gradient of the vehicle deceleration is in the range between 0.2 and 0.5 g, wherein g represents the constant of the acceleration due to gravity.-

4. The system as claimed in claim 3, wherein said steep gradient of the vehicle deceleration is in the range between 1 and 3 g.

* * * * *